Jan. 9, 1962    A. CHAIMOWICZ    3,016,520
ELECTRICAL SIGNAL STORAGE ARRANGEMENTS
Filed June 21, 1957
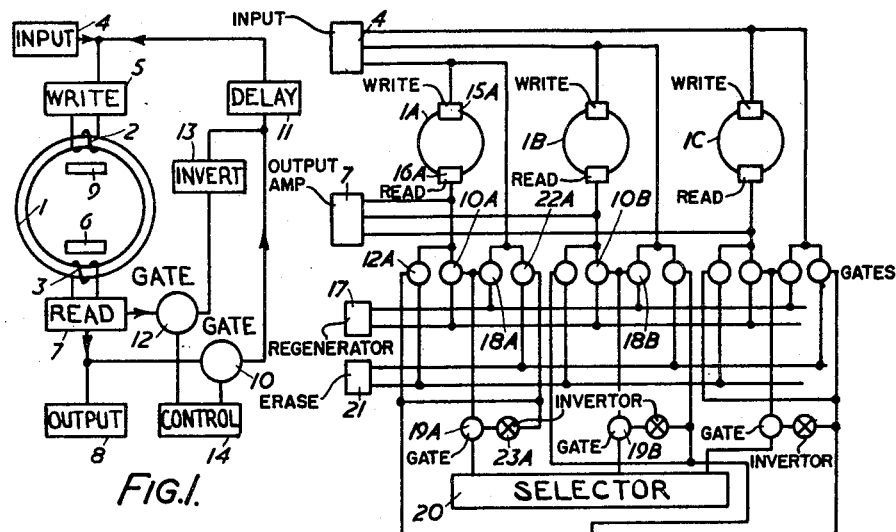
FIG.1.
FIG.2.
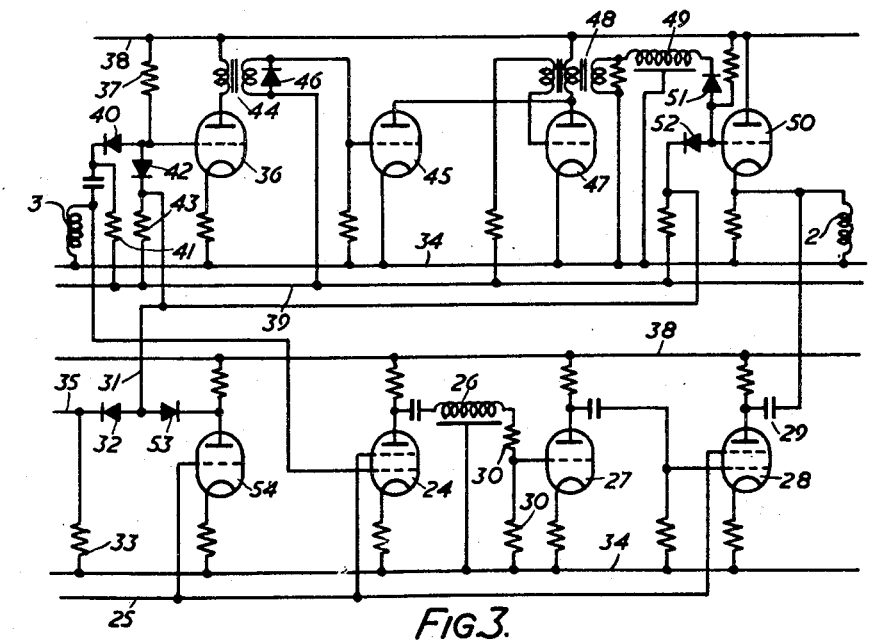
FIG.3.
INVENTOR
ADAM CHAIMOWICZ
BY
Hane and Nydick
ATTORNEYS

United States Patent Office 3,016,520
Patented Jan. 9, 1962

---

3,016,520
ELECTRICAL SIGNAL STORAGE
ARRANGEMENTS
Adam Chaimowicz, Stevenage, England, assignor to International Computers and Tabulators Limited, London, England, a British company
Filed June 21, 1957, Ser. No. 667,163
Claims priority, application Great Britain June 25, 1956
6 Claims. (Cl. 340—173)

The present invention relates to electrical signal delay circuits and in particular to such circuits employing mechanical delay devices.

By the term "mechanical delay device" is meant an arrangement in which an electrical signal is converted to a mechanical stress wave by an input transducer, the stress wave being re-converted to an electrical signal, after transmission through a suitable medium, by an output transducer. The delay introduced between the input and output signals is a function of the distance travelled by the stress wave between the input and output transducers and the velocity of propagation of the wave in the particular transmission medium. Examples of such a delay device are the ultrasonic delay lines in which an ultrasonic stress wave is transmitted through a column of mercury or a block of quartz using piezo-electric transducers and the magnito-strictive delay lines in which a stress wave is transmitted through a wire of nickel or other material, using magneto-strictive transducers.

In the case of magneto-strictive delay lines, a number of output transducers may be used, spaced at different distances from the input transducer. This enables an output signal to be obtained with several different delay times corresponding to the different distances. Regarded from another aspect, it provides an arrangement for repeatedly reading out the same signal at specified intervals. The theoretical limit to the number of transducers which may be employed is set by the distortion and attenuation of the wave. There are considerable practical difficulties, however, in mounting a large number of output transducers on a line.

In all the various kinds of delay line it is possible to couple an output transducer to the input transducer through an amplifying and signal re-shaping re-circulating circuit, so that a signal once introduced into the delay line is kept circulating.

Accordingly it is an object of the invention to provide an electrical signal storage arrangement employing a delay device in which a mechanical stress wave is produced in a transmission medium by an input transducer, the path of the stress wave in the transmission medium being arranged to form an effectively closed loop in relation to an output transducer so that a single stress wave is effective to operate the output transducer repeatedly.

It is a further object of the invention to employ a delay device in which the transmission medium forms a closed loop.

It is another object of the invention to employ a single re-circulating signal amplifying arrangement in association with two or more separate delay lines.

According to one form of the invention electrical signal delay apparatus includes a delay line formed by an input and an output transducer coupled to a transmission medium adapted to propagate mechanical stress waves, the delay line being characterised by the fact that the path of a stress wave generated in said medium by the input transducer is such that such stress wave is adapted to operate the output transducer repeatedly at pre-determined time intervals.

In another form of the invention electrical signal delay apparatus includes an input transducer adapted to generate in response to an electrical signal, a mechanical stress wave in a transmission medium and an output transducer adapted to detect the presence of a mechanical stress wave in a chosen portion of said medium and to generate an electrical signal in response thereto, characterised in that a stress wave generated by the input transducer follows a path which passes through said chosen portion of the medium a plurality of times.

In a further form of the invention electrical signal delay apparatus includes an input transducer responsive to an electrical signal to generate a mechanical stress wave in a transmission medium of a pre-determined shape and an output transducer adapted to generate an electrical signal in response to the occurrence of a mechanical stress wave in a pre-determined part of said medium characterised by the fact that a stress wave generated by the input transducer is constrained to follow a path which intersects with said pre-determined part a plurality of times.

The invention will now be described, by way of example, with reference to the accompanying drawings in which:

FIGURE 1 is a block schematic diagram of a delay line storage arrangement having means for regeneration and erasure.

FIGURE 2 is a block schematic diagram of three storage loops having an erase means and a regenerating means switchable to any of the loops.

FIGURE 3 is a circuit diagram of part of the arrangement shown in FIGURE 2.

A delay line 1 (FIGURE 1) is in the form of a loop of wire of a material which has magneto-strictive properties at least at transducing positions. The loop is provided with an input coil 2 and an output coil 3, which coils together with the magneto-strictive wire passing through them, constitute the input and output transducers respectively.

An input signal from a source 4 is applied to a write amplifier 5 which drives the coil 2. The transducing action of the coil results in the production of a longitudinal mechanical stress wave in the portion of the loop within the coil 2.

This wave travels outwards in opposite directions round the two halves of the loop and after a delay, determined by the velocity of propagation of the waves and the length of the half loop, the two waves coincide and reinforce each other at the mid point of the loop, which is the position of the output transducer.

A magnet 6, which can be a permanent magnet or an electromagnet, is used to polarise the output transducer so that the signal can be read out from the coil 3 to a reading amplifier 7 which reshapes the output pulse for utilisation by an output device 8.

The stress waves continue to circulate in opposite directions around the loop and the signal is again available for read-out from coil 3 after each successive circulation until it is cancelled or until it has deteriorated to such an extent that it is no longer usable as an output signal. The first output is thus obtained after a delay equal to half the loop delay and thereafter outputs are available at intervals equal to the full delay of the loop.

In using the delay as a storage device, for example as a buffer store between an arithmetic unit and a main store or input and output equipment in an electronic calculator, it is convenient to store more than one data representing signal in the loop. A serial pulse train from the source 4 will circulate in the loop and be available for read-out at intervals in the same manner as described above, provided that the duration of the train does not exceed the delay time of the loop.

The use of a magnet 9 to polarise the input transducer permits lower amplitude driving pulses to be fed to coil 2; if however the pulses have sufficient amplitude, the magnet 9 is rendered unnecessary.

The total delay obtainable is limited by the successive degradation of the signal at each circulation. To obtain a greater delay, the signal is read out, after having circulated a number of times, reshaped and then reinserted in the loop, thus making the data again available for read out from the loop. This regeneration can be repeated at intervals for as long as it is desired to retain the data in the store. Regeneration is effected by passing the reshaped pulse train from amplifier 7 via a gate 10 to a delay 11 and thence to the amplifier 5. The delay 11 is arranged to be equal to half the loop delay so that the reshaped signals are fed to amplifier 5 at the time when the corresponding stress waves from which they were derived coincide at the position of the input transducer. In this way data is re-entered into the store in the same position and the remanent degraded signal circulating in the loop will merely reinforce the regenerated signal. Because data is re-entered in the same position, it is read out after an interval which is an integral multiple of the loop delay, independent of the number of regenerations that have occurred between the initial appearance at the position of the output transducer and when it is read out.

Erasure of the contents of the store prior to reading in new data is effected by writing into the store a signal which is the inverse of the data in the store. The stress waves produced by this inverse signal and the existing waves circulating in the store coincide at the input transducer and tend to cancel out. The signals read out from the coil 3 are not reshaped but are applied via a gate 12 to an inverter 13. The output from the inverter is delayed by the delay unit 11 and fed to amplifier 5. The arrangement of inverter 13 is such that the stress wave produced by the input transducer is the inverse of the corresponding stress wave from which it was derived and is of equal amplitude, so that when the two waves coincide at the position of the input transducer, they tend to cancel. Any remanent waves are further cancelled by maintaining gate 12 open for a further delay period, permitting another proportional cancellation during the next circulation round the loop.

Gates 10 and 12 are operated under control of a control unit 14 which is synchronised, for example by clock pulses, with the transfer of data from the source 4, so that by selective operation of the gates 10 and 12 and the source 4, selected data in the store can be regenerated for further storage while the remainder is erased and replaced by new data.

Functionally, the closed loop is the equivalent of a line sufficiently long to provide a delay equal to the natural delay period of the loop multiplied by the number of times a signal can circulate round the loop without deteriorating to the point at which it fails to produce a usable output from coil 3. The line would have pick up coils spaced at intervals equal to the natural delay period of the loop. Thus the closed loop clearly occupies much less space and requires fewer coils than the equivalent long line. Furthermore, there are considerable practical difficulties in supporting a long line in closely coupled relationship to a number of spaced pick up coils without introducing losses in the line due to supports arranged at intervals along its length.

The stress waves may travel many times round the loop before they are deliberately cancelled, so that acoustic discontinuities in the loop should be avoided as far as possible. Accordingly instead of a length of wire or tube with the ends joined, it is preferred to use a ring cut from a sheet of nickel. Alternatively a ring of brass or copper may be used, the surface of the ring in the vicinity of the input and output coils being plated with nickel to provide the necessary magnetostrictive coupling. For high frequency operation, a composite line, such as that described in British Patent 823,549, may be used.

Provided that the path taken by the stress wave is linked a number of times with the output transducer, the path need not be physically closed. For example, the transmission medium for the stress wave may take the form of a helix of nickel wire. The turns are of equal length and are closely spaced so that the coil forming the output transducer may conveniently be wound over all the turns. Both ends of the helix are mounted in a material which absorbs the stress wave, so that reflections are reduced to a minimum. The input transducer is positioned on one turn of the helix, close to one end. Thus, when the input transducer is energised, it generates a stress wave which is propagated in the wire in opposite directions. The stress wave in one direction is absorbed almost immediately by the wire mounting. The stress wave travelling in the opposite direction passes through, for each turn of the helix, a portion of the wire surrounded by the output transducer, so generating an electrical output pulse. The helical form is equivalent, therefore, to the ring form except that a circulating stress wave cannot be cancelled, so that regeneration, or a new entry cannot be made effective until the propagated stress wave has reached the last turn of the wire which is coupled to the output transducer.

It is not necessary that the wire or other material, forming the transmission medium for the stress wave should provide a circular path, although sharp bends in the path should be avoided as they tend to produce spurious reflected waves. Transverse or torsional stress waves may be utilised instead of longitudinal waves by providing suitably designed transducers.

A wire, or a tube, of solid material provides such a sharp discontinuity at the surface that a stress wave is propagated along it without substantial loss due to reflection, even when the wire, or tube, is bent into a circle, helix etc. This is not the case when a wave is propagated in a liquid such as mercury. Hence, in applying the invention to such a delay line a modified form of construction is desirable. One suitable form for a mercury delay line is a square or rectangle with reflectors placed at the corners. The input transducer may be of the usual piezo-electric form and is recessed into one of the reflectors. It launches a stress wave along one side and the reflector at the corner is set at 45° to this side, so that the wave is reflected and travels along the second side. The wave then impinges on a piezo-electric output transducer which is also set at an angle of 45° to the path of the wave, so that the wave operates the transducer but is also reflected along the third side. The wave is then reflected by the reflector containing the input transducer and commences another circuit. Preferably, the reflectors are set at a slight angle to the plane of the square, so that on the fourth reflection the wave impinges upon a part of the reflector other than that in which the input transducer is recessed. Thus, the wave follows a slightly different path on each circuit, in a manner comparable to that of the helical form of line described above.

It will be appreciated that the input and output transducers may be coupled to the same portion of the transmission medium or that a single transducer may be used with a switching arrangement which allows it to be used either as an input or an output transducer.

As a signal may make many circulations of the loop before it needs to be regenerated, a single regenerating circuit may be used with a plurality of storage loops. The regenerating circuit is connected to one loop for the duration of the delay period, it is then switched to the next loop, to regenerate the signal stored therein, and so on for the other loops in turn.

Such an arrangement is shown in FIGURE 2 in which 1A, 1B and 1C are three storage loops, each loop having an input transducer 15 and an output transducer 16. Where the component of a particular loop is referred to, the appropriate letter A, B or C will be added to the reference number, depending on which loop 1A, 1B or 1C it is associated with.

A regenerating circuit 17 can be connected to the output transducer 16A by the operation of gate 10A. The output of 17 can be connected to the input transducer 15A by the operation of a gate 18A.

The gates 10A and 18A are controlled by the operation of a normally open gate 19A which receives an input from a selector 20. Similar gates 10, 18 and 19 connect the regenerating circuit 17 to the transducers 15 and 16 of the other storage loops under control of the selector 20. The lines from the selector controlling the gates 19 are selected in succession, each gate receiving an input for the duration of one complete circulation of the loop. Thus when gate 19A is selected gates 10A and 18A are opened and the circuit 17 regenerates the data stored in loop 1A. After all the data in the loop has been regenerated gates 10A and 18A are closed and gates 10B and 18B are opened. The circuit 17 is thus associated with loop 1B and the data stored therein is regenerated. Similarly loop 1C and others not shown are associated with circuit 17 in succession by the action of selector 20.

It will be appreciated that the maximum number of loops which can be regenerated by the single circuit 17 depends on how many circulations are possible before the data in a selected loop needs regenerating.

The selector 20 can be a switching device operating in a cyclic manner, such as an electronic counter, a ring distributor or a multi-cathode switching tube, which is advanced one stage for each loop regeneration time.

Data held in any loop can be read out by a common amplifier 7 switched to a selected output transducer 16.

Erasure is effected by switching an erasing circuit 21 to a selected loop under control of the control unit 14. To erase the data in loop 1A, gate 12A and a gate 22A are opened by a control voltage from unit 14. Gates 12A and 22A associate the erasing circuit 21 with the transducers 16A and 15A respectively, permitting data in the loop to be erased as long as gates 12A and 22A remain open.

To prevent a possible regenerating cycle from taking place while erasing is in progress, the control voltage from 14 operates an inverter 23A. The output from the inverter controls gate 19A in such a manner that when gates 12A and 22A are open, gate 19A is closed, thus preventing the regenerating circuit 17 from being switched to the transducers 16A and 15A during an erasing cycle. Similar gates 12 and 22 and inverters 23 are associated with the other loops to permit erasure of any of the loops under control of the unit 14.

New data can be stored in an erased loop by switching the writing amplifier 4 to a selected input transducer 15.

A circuit diagram of part of the arrangement of FIGURE 2 is shown in FIGURE 3. The output of the reading coil 3 is fed to one grid of a gating valve 24 which comprises the gate 12 (FIGURE 2). The gate is controlled from the unit 14 over a line 25 connected to a second grid of valve 24. When the loop associated with coil 3 is selected for erasure, a positive potential is applied to line 25 which conditions valve 24 to pass the wave train from coil 3, via a coupling capacitor, to a delay line 26. The output from the delay line is amplified by a valve 27 and fed to a gating valve 28 which comprises the gate 22. This valve is controlled by the potential of line 25 in a similar manner to that of valve 24. The output from valve 28 which is a delayed and inverted version of the input from coil 3, is fed via a capacitor 29 to the coil 2 of the input transducer. An attenuator comprising resistors 30 in the input circuit to valve 27 ensures that the resultant inverse stress wave produced by the input transducer is equal in amplitude to the wave it is to cancel. When the control potential on line 25 is negative, the gating valves 24 and 28 are cut off and erasure ceases.

Regeneration is effected under control of a line 31, the potential of which is normally low by reason of a connection via a diode 32 and a resistor 33 to an earth line 34. A positive voltage from the selector 20 over a line 35 prevents conduction through diode 32 and the potential of line 31 rises.

The grid of an input valve 36 is connected via a resistor 37 to a positive supply line 38. It is also connected to a negative bias line 39 via two paths, one comprising a diode 40 and a resistor 41 and the other a diode 42 and a resistor 43. The diode 42 forms the gate 10. The junction of diode 42 and resistor 43 is joined to the line 31, so that when the potential of line 31 is raised, the path through diode 42 is closed. The junction of diode 40 and resistor 41 is connected via a capacitor to the coil 3, so that when a positive input pulse occurs, the gating diode 40 is closed and the grid potential of valve 36 rises, causing the valve to conduct. Valve 36 includes the primary of a transformer 44 in the anode circuit and the positive output from the secondary of the transformer is taken to the grid of a driver valve 45, a diode 46 across the secondary serving to suppress any negative output from the transformer. The anode of valve 45 is connected to the anode of a valve 47 which operates as a blocking oscillator. Valve 45 is normally cut off but on the occurrence of a positive pulse from transformer 44, it conducts and draws current through a blocking oscillator transformer 48 in the anode circuit of valves 45 and 47. The secondary of transformer 48 is heavily damped and the single output pulse is delayed by a delay line 49 and applied, via a gating diode 51 to the grid of a cathode follower valve 50 which drives the coil 2. Valve 50 is controlled by the line 31 via a gating diode 52 which forms the gate 18 (FIGURE 2).

To prevent regeneration while erasing is being effected, the potential of line 31 is also controlled by a diode 53 which forms the gate 19. This gating diode is controlled, via an inverting valve 54, by the potential of line 25, so that when line 25 is positive, valve 54 conducts and the anode voltage falls. This permits diode 53 to conduct and so prevent the potential of line 31 from rising sufficiently to open the gates formed by diodes 42 and 52.

The constants of the blocking oscillator circuit and of the delay line 49 are such that a degraded pulse from coil 3 triggers the blocking oscillator and after a delay is passed to coil 2 to produce a stress wave of correct shape, one-half loop delay time after the input at coil 3, thus regenerating the signal circulating in the loop.

The regenerating circuit 17 comprises the part of the circuit between the input of valve 36 and the output of the delay line 49 and is connected with the gates and transducers associated with the other loops. The cathode follower valve 50 is part of the transducing arrangement referenced 15.

I claim:

1. Electrical signal delay apparatus comprising a plurality of magento-strictive delay lines, each providing the same delay and each comprising a closed loop of magneto-strictive material, at least one input transducer for generating a mechanical stress wave in two directions in each of said loops in response to an electrical input signal, at least one output transducer mounted in relation to each of said loops for detecting the passage of said wave through a chosen portion of said loops and for generating an output electrical signal in response to a detected stress wave, said input and output transducers being positioned with respect to one another to have the transit times of said stress waves in said two directions substantially equal thereat; common cancelling means for generating and applying to said input transducer of any one of said delay lines in response to an output electrical signal from said output transducer of the same delay line a cancelling signal for generating in the loop of the corresponding delay line a cancelling stress wave which is substantially equal and opposite to a stress wave already circulating therein to cancel said circulating stress wave; and switching means for selectively connecting said common cancelling means to the input and output transducers of any selected one of said delay lines.

2. Electrical signal delay apparatus as claimed in claim 1, comprising a plurality of input transducers, one of which is included electrically in each of said loops, a plurality of output transducers, one of which is included electrically in each of said loops, a plurality of cancelling means for generating and applying to each of said input transducer of any one of said loops in response to an output signal from the corresponding output transducer of the same loop a cancelling signal for generating in said same loop a cancelling stress wave which is substantially equal and opposite with respect to a stress wave already circulating therein to cancel said stress wave, and switching means for selectively connecting one of said plurality of cancelling means to the input and output transducers of any one of said loops.

3. Electrical signal delay apparatus comprising a mechanical stress wave transmission medium, input transducer means for generating a mechanical stress wave in said medium in response to an input electrical signal, output transducer means for detecting the presence of a mechanical stress wave in a chosen portion of said medium and for generating an output electrical signal in response to the detected stress wave, said medium being arranged to form a closed loop including said chosen portion, whereby said stress wave circulates in said medium and may be repeatedly detected by said output transducer means, electrical means operatively connected to said input and output transducer means and responsive to the output of said output transducer means for generating a regenerative electrical signal, said input transducer means being responsive to said regenerative signal for maintaining a stress wave already in said medium, electrical cancelling means operatively connected to said input and output transducer means and responsive to the output of said output transducer means for generating a cancelling signal for substantially cancelling a stress wave already in said medium, and switching means connected to said regenerative means and to said cancelling means for selectively energizing either one thereof to control the stress waves in said medium.

4. Electrical signal delay apparatus comprising a plurality of magneto-strictive delay lines, each providing the same delay and each comprising a closed loop of magneto-strictive material; a plurality of input transducers, one of which is operatively coupled to each of said loops for generating a mechanical stress wave in each of said loops in response to an electrical input signal; a plurality of output transducers, one of which is operatively coupled to each of said loops for detecting the passage of said wave through a chosen portion in each of said loops and for generating an electrical output signal in response to a detected wave, cancelling means for generating and applying to any one of said input transducers in response to an output electrical signal from the corresponding output transducer of the same loop a cancelling signal for generating in said same loop a cancelling stress wave which is substantially equal and opposite with respect to a stress wave already circulating therein to cancel said stress wave; regenerating means for amplifying and reforming an electrical output signal from any one of said output transducers and applying said amplified and reformed signal to the corresponding input transducer of the same loop to augment the stress wave already circulating in the same loop; first switching means for selectively connecting said cancelling means to the input transducers and output transducers of any selected one of said loops; second switching means for selectively connecting said regenerating means to said input transducers and corresponding output transducers of said loops respectively in sequence; and means preventing simultaneous connection of said cancelling means and of said regenerating means to said input transducer and said output transducer of any one of said loops.

5. Electrical signal delay apparatus comprising a plurality of magneto-strictive delay lines, each providing the same delay and each comprising a closed loop of magneto-strictive material; a plurality of input transducers one of which is operatively coupled to each of said loops for generating a mechanical stress wave in each of said loops in response to an electrical input signal; a plurality of output transducers, one of which is operatively coupled to each of said loops for detecting the passage of said wave through a chosen portion in each of said loops and for generating an electrical output signal in response to a detected wave, cancelling means for generating and apply to any one of said input transducers in response to an output electrical signal from the corresponding output transducer of the same loop a cancelling signal for generating in said same loop a cancelling stress wave which is substantially equal and opposite with respect to a stress wave already circulating therein to cancel said stress wave; regenerating means for amplifying and reforming an electrical output signal from any one of said output transducers and applying said amplified and reformed signal to the corresponding input transducer of the same loop to augment the stress wave already circulating in this same loop; a plurality of first gates, one of which is connected between each of said output transducers and said regenerating means; a plurality of second gates, one of which is connected between said regenerating means and each of said input transducers; selector means providing a plurality of sequential selecting signals; a plurality of third gates, one of which is connected to, each of said first gates associated with each said loop and to each corresponding one of said second gates associated with the same loop, each third gate being responsive to one of said selecting signals to render said first gates and said second gates operative to connect sequentially said regenerating means to each of said loops; a plurality of fourth gates, one of which is connected between each of said output transducers and said cancelling means; a plurality of fifth gates, one of which is connected between said cancelling means and each said input transducers; control means connected to each of said fourth gates and to each of said fifth gates and to each of said third gates for selectively energizing any one of said fourth gates associated with said loops and a corresponding one of said fifth gates associated with the same loop and for selectively rendering inoperative a corresponding one of said third gates associated with the same loop to prevent simultaneous connection of said cancelling means and of said regenerating means to any one of said loops.

6. Electrical signal delay apparatus comprising a closed loop of magneto-strictive material; input transducer means operatively coupled to said loop for launching a mechanical stress wave in said loop in response to an electrical input signal; output transducer means operatively coupled to said loop to generate an electrical output signal in response to the passage of a stress wave through a portion of said loop; input means connected to said input transducer means for applying an electrical input signal to said input transducer means to launch a stress wave representing said input signal; signal delay means connected to said input transducer means and operative to provide a signal delay time equal to the transit time of a stress wave in said loop between said input transducer means and said output transducer means; a first gate connected to the input of said signal delay means and responsive to said electrical output signal from said output transducer means; signal inverter means connected to the input of said signal delay means; a second gate connected to the input of said signal inverter means and responsive to said electrical output signal from said output transducer means; and control means having two states, said control means when in one of said states energizing said first gate and said control means when in the other of said states energizing said second gate.

References Cited in the file of this patent

UNITED STATES PATENTS

| | | |
|---|---|---|
| 2,629,827 | Eckert | Feb. 24, 1953 |
| 2,659,869 | Allison | Nov. 17, 1953 |
| 2,736,881 | Booth | Feb. 28, 1956 |
| 2,790,160 | Millership | Apr. 23, 1957 |
| 2,814,793 | Bonn | Nov. 26, 1957 |

OTHER REFERENCES

Application of Magnetostrictive Delay Lines, by Robbins and Millership, Automatic Digital Computation, Proceedings of a Symposium National Physics Lab., Mar. 25, 1953, pp. 199–210.